A. T. NEWELL.
RUNNING GEAR.
APPLICATION FILED OCT. 29, 1908.
942,182.
Patented Dec. 7, 1909.
2 SHEETS—SHEET 1.
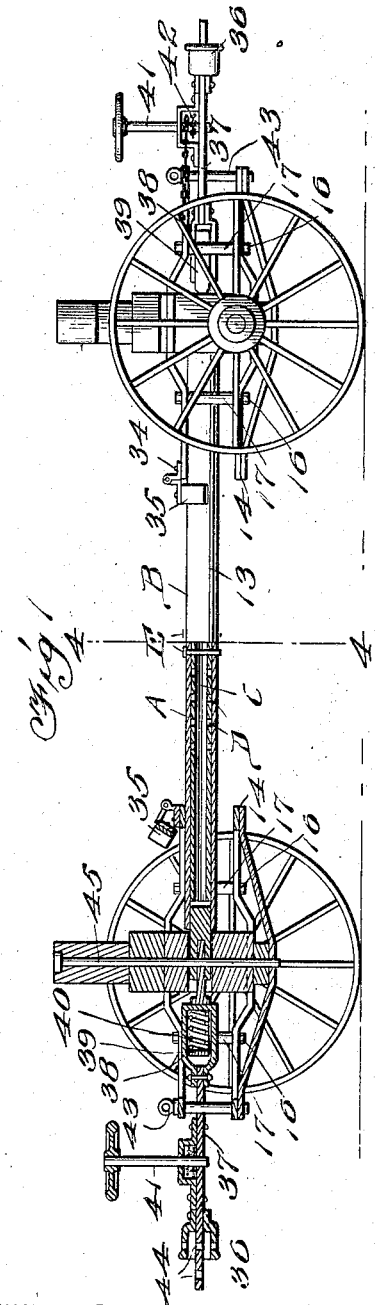
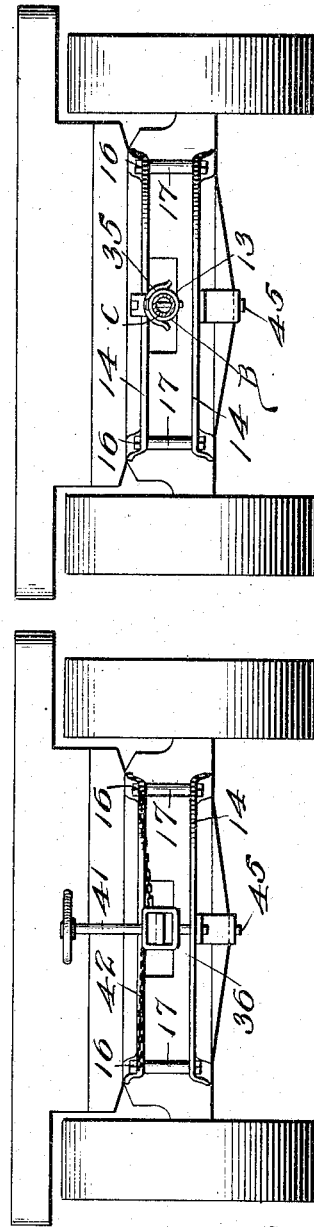
Inventor
Alfred T. Newell.

A. T. NEWELL.
RUNNING GEAR.
APPLICATION FILED OCT. 29, 1908.
942,182.
Patented Dec. 7, 1909.
2 SHEETS—SHEET 2.
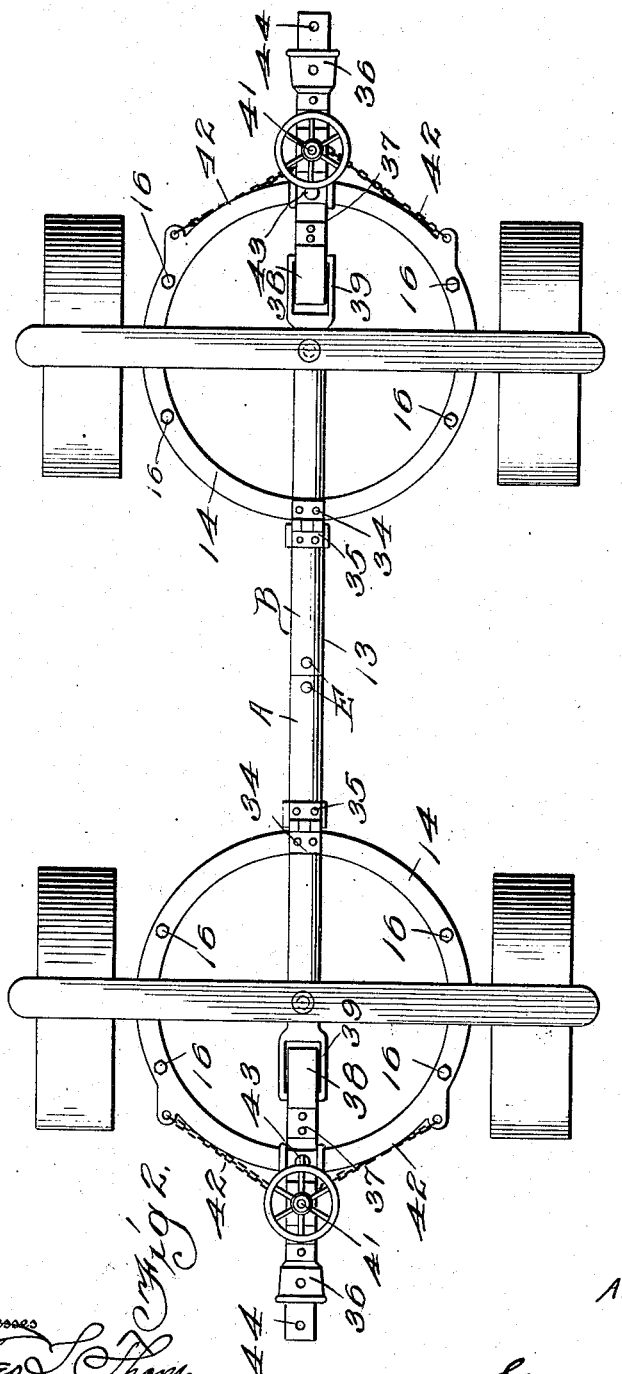
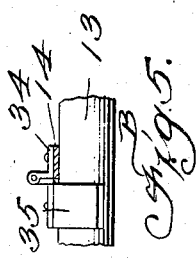
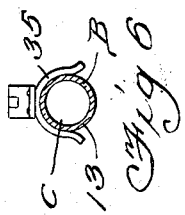
Inventor
Alfred T Newell.
Witnesses
By
Attorney

UNITED STATES PATENT OFFICE.

ALFRED T. NEWELL, OF BIRMINGHAM, ALABAMA.

RUNNING-GEAR.

942,182. Specification of Letters Patent. Patented Dec. 7, 1909.

Original application filed June 20, 1908, Serial No. 439,547. Divided and this application filed October 29, 1908. Serial No. 460,039.

*To all whom it may concern:*

Be it known that I, ALFRED T. NEWELL, a citizen of the United States, residing at Birmingham, in the county of Jefferson and State of Alabama, have invented certain new and useful Improvements in Running-Gear, of which the following is a specification.

This invention relates to running gear for wagons, and the present application is a division of my pending application No. 439,547, filed June 20, 1908.

The object of the present invention is to provide a wagon that may be run in either direction, by means of which considerable time may be saved, particularly when the wagon is being used on narrow roads, which have heretofore required wagons to be moved to a point in the road where they could be turned.

A further object of the invention is to provide means for coupling a number of wagons to form a train that may be attached to a traction engine or the like, with improved devices for controlling the movement and operation of the wagons in either direction.

The invention is illustrated in the accompanying drawings in which—

Figure 1 is a side elevation of the running gear, partly in section; Fig. 2 is a plan view thereof; Fig. 3 is an end elevation; Fig. 4 is a sectional view on the line 4—4 of Fig. 1; Fig. 5 is a detail side view of the cuff; Fig. 6 is a transverse section thereof.

The body of the wagon may be the same as that disclosed in my pending application referred to above, or it may be any other suitable body as desired. The running gear has front and rear trucks connected by a coupling pole 13 to be hereinafter more fully described. Each bolster is provided with a fifth wheel 14 consisting of spaced annular plates secured together by bolts 16 which are passed through spacing sleeves 17, as shown. The trucks thus arranged will support the wagon body in the ordinary or desired manner.

It will be seen that by providing a fifth wheel at each end of the wagon, either end may be considered the front. Each fifth wheel is provided with a bracket 34, to which is hingedly connected a cuff 35. It will be understood that by disengaging the cuff at either end from the coupling pole, that truck adjacent to the disengaged cuff may be turned. When both cuffs are engaged with the pole, it is obvious that the wagon is held perfectly rigid, also, the draft in a wagon train is not carried through the body of the wagon, but directly through the coupling members 36 secured to draw bars 37. The draw bars are provided with yoke shaped inner ends 38 disposed for movement in the slotted heads 39 at the ends of the coupling pole. The draw bars are provided with coiled springs 40 absorbing the jar incident to the starting of the wagon.

Each draw bar supports a revoluble shaft 41, around which is wound a chain 42 having its ends secured to the fifth wheel adjacent to said shaft, as shown. The fifth wheel at each end of the wagon is provided with a removable pin 43 engaged in a passage formed in the draw bar adjacent to the wheel. Each draw bar is provided with a pair of passages 44, the innermost passage being disposed in line with passages formed in the coupling head. The coupling pole is pivotally engaged at each end to the trucks by means of vertical pins 45. By removing either of the pins 43 and turning the shaft 41 adjacent to the pin, the truck at that end may be turned or moved to assist in the coupling of two wagons that are not in the same line.

When a train of wagons are to be coupled together and it is desired to back, it becomes necessary to have the wagon rigid; therefore, the couplings of each wagon are lapped over each other, and two coupling pins are used at each point; thus making the coupling poles and couplings of the whole train one rigid piece, as will be understood, and the plurality of wagons are forced to back in a straight line.

From the description, it will be seen that the wagon may be run in either direction, thus saving considerable time in narrow roads which would require the wagon to be moved to a point where it could be turned. An ordinary traction engine may be attached to the wagon and it may be stated that the engine can be detached from one end of the wagon and attached to the other end, and by reversing the positions of the cuffs as described, the wagon is reversed, *i. e.*, the front end of the wagon is reversed in order that it may be drawn in an opposite direction.

The coupling pole is made in two sections A and B, and disposed within the pole, there is shown a pipe section C. The construction is such that the body frame can be lifted or removed from the bolsters, and by the provision of adjusting openings D made in the section C, the pole may be lengthened in order that the wagon may be used for hauling lumber and the like. Suitable pins E are provided for holding the sections A and B to the section C.

I claim:

1. The combination of trucks each provided with a fifth wheel, a pole connecting the trucks, and cuffs hinged to the fifth wheel and arranged to be swung to or from locking engagement with the pole.

2. The combination of a truck, a pole pivotally connected to the truck, a draw bar pivoted to the truck, and a fifth wheel comprising spaced upper and lower annular plates connected together and fixed to the truck and extending across the draw bar and the pole respectively above and below the same, with the upper plate resting on the pole.

In testimony whereof, I affix my signature in presence of two witnesses.

ALFRED T. NEWELL.

Witnesses:
  THOMAS W. MARTIN,
  WM. L. MARTIN.